US008489484B2

(12) United States Patent
Lange et al.

(10) Patent No.: US 8,489,484 B2
(45) Date of Patent: Jul. 16, 2013

(54) METHOD AND SYSTEM FOR REVERSE MORTGAGE REPLICATION USING REMAINDER INTERESTS

(75) Inventors: Jeffrey Lange, New York, NY (US); Jeffrey Lewis, New York, NY (US)

(73) Assignee: Guggenheim Partners, LLC, New York, NY (US)

( * ) Notice: Subject to any disclaimer, the term of this patent is extended or adjusted under 35 U.S.C. 154(b) by 537 days.

(21) Appl. No.: 12/287,312

(22) Filed: Oct. 8, 2008

(65) Prior Publication Data

US 2009/0106142 A1      Apr. 23, 2009

Related U.S. Application Data

(60) Provisional application No. 61/000,052, filed on Oct. 23, 2007.

(51) Int. Cl.
    *G06Q 40/00* (2012.01)
(52) U.S. Cl.
    USPC .......................................... 705/36 R; 705/35
(58) Field of Classification Search
    USPC ....................................................... 705/36 R
    See application file for complete search history.

(56) References Cited

U.S. PATENT DOCUMENTS

| 2002/0055905 | A1* | 5/2002 | Jannah et al. | 705/38 |
| 2006/0089902 | A1* | 4/2006 | Kim et al. | 705/38 |
| 2006/0116951 | A1* | 6/2006 | Kim et al. | 705/38 |
| 2008/0120215 | A1* | 5/2008 | Wagner | 705/35 |
| 2008/0183617 | A1* | 7/2008 | Schneider | 705/39 |
| 2009/0030853 | A1* | 1/2009 | De La Motte | 705/36 R |
| 2009/0076973 | A1* | 3/2009 | Kemper et al. | 705/80 |

OTHER PUBLICATIONS

Rubin, Harvey, Barrons Dictionary of Insurance Terms, Fourth Edition, ISBN: 07641-1262-7.*

* cited by examiner

*Primary Examiner* — Kirsten Apple
(74) *Attorney, Agent, or Firm* — Winston & Strawn LLP (57) ABSTRACT

Methods for providing remainder interests with protection to a seller and mitigation of the potential consequences suffered by related financial instruments. The protected remainder interest financial instrument includes submitting a seller to underwriting to accurately determine the seller's remaining life expectancy, and purchasing the protected remainder interest of an illiquid asset from the seller leaving the seller with a life estate. The method includes a client system for displaying information related to the transaction and inputting information related to the seller, illiquid asset, and the buyer. The client system is used to create a request to create the protected remainder interest. A server system accepts the request, stores the information in memory, and creates the protected remainder interest. The server system includes software for linking seller and buyers of protected remainder interests, which include terms of the protected remainder interest such as contingent sale or contingent purchase schedules.

11 Claims, 2 Drawing Sheets

METHOD AND SYSTEM FOR REVERSE MORTGAGE REPLICATION USING REMAINDER INTERESTS

CROSS-REFERENCE TO RELATED APPLICATION

This application claims priority to U.S. Provisional Patent Application No. 61/000,052 filed Oct. 23, 2007, which is incorporated herein by reference.

FIELD OF THE INVENTION

The present technology generally relates to providing protected remainder interests. More particularly, the present technology relates to a method and system for providing protected remainder interests that are flexible financial instruments providing protection to sellers and mitigating the potential consequences suffered by other financial instruments.

BACKGROUND OF THE INVENTION

A type of financial instrument called a reverse mortgage loan provides a lump sum, credit line, or monthly payments to borrowers. The loans are secured against a first mortgage deed on the home. Unlike traditional mortgage loans, current interest or principal payments are not required and the credit quality of the borrower, as measured, for example, by a Fair Isaac Corporation (FICO) score, is not relevant to underwriting of the loan. The loan is asset-based only, i.e., secured non-recourse against the property. Interest accrues and is compounded at the loan rate. As the debt balance grows, the loan to value (LTV) ratio typically increases over time, with the expectation that the last borrower will either move, die, or vacate the home for a period longer than 12 months before the LTV exceeds one, at which point the lender begins to suffer losses.

The reverse mortgage market is growing at over a 50% rate per annum as of 2007. The market is segmented into loans against homes with values less than approximately $400,000 and those above. For the former, borrowers are typically issued a Federal Housing Administration (FHA)—insured Home Equity Conversion Mortgage or HECM. As of 2007, the loan rate for HECM's was 150 basis points over the constant maturity one year treasury bill, which includes 50 basis points of FHA insurance which enables lenders to sell their loans to FHA upon the loans attaining a 98% LTV. For non-HECM or proprietary loans, the average rate as of 2007 was approximately three month London Inter-bank Offered Rate (LIBOR)+350 basis points. The amount of lump sum advance or credit line is determined by the principal limit factor or PLF. The PLF is a function of interest rates, assumed future housing appreciation (HPA), and the mortality, morbidity, and mobility (MMM) of the borrower or borrowers. The older the borrower, all else being equal, the higher the PLF and the greater amount of the proceeds that the borrower can receive. The greater the expected morbidity and mobility, all else being equal, the greater the amount of proceeds the borrower can receive. For the LIBOR+350 product, a 70 year old female who owns a house appraised at $1 million can expect to receive approximately $400,000 (as of 2007) in proceeds. The undrawn portion of the credit line increases with the loan rate in typical proprietary products although other growth rates may be used.

Unfortunately, the reverse mortgage market, as it is developing in the United States, suffers from a number of significant inefficiencies and consequences. As can be seen from the above description, the amount of proceeds (PLF) that can be advanced to a borrower is a function of his or her age (or a function of both ages in the case of a couple). The mortgage banking industry offering reverse mortgages uses the applicant's current age as a proxy for life expectancy. However, under federal non-discrimination laws applicable to the mortgage banking industry (i.e., credit transactions), a lender may not discriminate based upon applicant's gender or health status. Thus, the reverse mortgage industry must consider all single borrowers to be female or FESA, using the industry vernacular for "Female Equivalent Single Age." As males have lower life expectancies than females, the use of FESA means that the mortgage banking industry provides reduced proceeds to males in an effort not to discriminate by applicant gender or providing too much proceeds to women by offering the male proceeds rate (if the industry adopted the "Male Equivalent Single Age" it would tend to increase proceeds to females).

Furthermore, current applicant age is a poor proxy for life expectancy. Otherwise, life insurance companies would not spend the enormous time and money they do underwriting each individual life insurance case. Every insured applicant who has taken out life insurance knows the time and inconvenience associated with the apparently simple process of obtaining life insurance. The underwriting process is meant to supply additional and statistically significant information about a person's expected lifespan. Underwriting in this manner should be common in the reverse mortgage industry. After all, a very sick 70 year old with reduced life expectancy should get more proceeds (higher PLF factor) than a healthy 70 year old. But again, anti-discrimination law prevents the practice of underwriting (presumably because it discriminates between the healthy and the sick).

By prohibiting common sense utilization of information such as gender, health status and other factors that can help determine life expectancy, the current regulatory environment quite severely limits the ability of the reverse mortgage industry to operate in the most efficient manner.

Reverse mortgage loans are distributed by mortgage bankers and mortgage brokers licensed and regulated under mortgage banking laws. Mortgage sales staffs are not in the practice of advising or establishing a lifelong relationship with a customer. Yet a reverse mortgage transaction, which is in essence a lifecycle transaction rather than a discrete asset financing, beckons for an enduring relationship with the customer. Typically, those involved in lifecycle financial planning are certified financial planners and life insurance agents. Yet, because of mortgage banking regulation at the state and federal level, it is nearly impossible for these professionals to be paid for making a referral or providing transaction flow to mortgage bankers and brokers offering reverse mortgage products. As such, because of regulatory barriers, there is a great difficulty in providing efficient and adequate services and products to the reverse mortgage customer.

Furthermore, the primary use of reverse mortgage proceeds by borrowers is to purchase necessities such as long term care, Medicare part D coverage, lifetime income in the form of immediate or deferred annuitization or longevity insurance, and others necessities. However, life and health insurance providers who sell these products and services are licensed and regulated under state insurance laws and are rarely licensed to sell reverse mortgages. Thus, as long as reverse mortgages and the products and services purchased with reverse mortgage proceeds are regulated under different regimes and offered by different industries, there will be inefficiencies in their distribution.

Reverse mortgages suffer from two types of inefficiencies. First, for the lender, the reverse mortgage loan, which pays no current interest, is an Original Issue Discount (OID) instrument. As such, the lender or loan owner pays tax currently at full ordinary income rates (assuming a taxable investor) even though no income is actually received. A simple example follows: 1) Value of home: $1,000,000; 2) Age of borrower: 70; 3) PLF: 40%; 4) Proceeds: $400,000 (PLF*Home Value); 5) Loan Rate: LIBOR+350 basis points; and LIBOR: 5.5%.

In this example, the loan accrues at 9% (LIBOR at 5.5%+ margin of 3.5%) and no interest is currently paid by the borrower. However, the lender or the owner of the loan must pay ordinary income tax on the accruing interest under the Original Issue Discount (OID) rules under the Internal Revenue Code (26 USC sections 1271-1275). For example, assume the lender pays tax at a federal tax rate of 35%. Each year the lender is taxed on the 9% accrual and must pay 3.15% or 35% of the coupon as tax even though no income is received. Strikingly, even though the lender must pay tax currently, the borrower does not receive an offsetting deduction. This is because debt against personal use property is not considered eligible for deductions under the rules for cash basis taxpayers (almost all homeowners are cash basis taxpayers). The gross asymmetry of taxation makes reverse mortgages more expensive to provide. To make matters worse, a reverse mortgage is typically taken out by a borrower who has lived in his current home for some time. Reverse mortgage deductibility is therefore limited to the interest that accrues on only $100,000 of the loan (as with home equity loans). The few reverse mortgage loans that are used in original acquisitions of homes may qualify for the full deductibility of interest on up to $1,000,000 of debt. Thus, the typical tax scenario is that the lender pays full ordinary tax on a current basis without receiving income and the borrower deducts a small portion of the interest on a deferred basis when the loan is eventually paid.

Reverse mortgages are inefficient for another reason. If the reverse mortgage debt balance exceeds the value of the home, and the loan becomes due or is repaid (e.g., borrower dies or moves), the borrower can incur substantial capital gains tax under the principal of debt forgiveness as the following two examples illustrate based on the following assumptions: 1) Borrower's basis in home: $100,000; 2) Home's current value: $1,000,000; 3) Reverse mortgage proceeds: $400,000; 4) Reverse mortgage not original acquisition indebtedness; 5) Tax Code section 121 requirements met; and 6) At death of Borrower: Outstanding loan balance is $2,000,000 and FMV of home is $1,000,000.

Example 1: If borrower is sole owner of property and dies before Dec. 31, 2009 or after Jan. 1, 2011 and a sale of the home takes place where debt balance greater than FMV, the following is the tax consequence: 1) Basis of property: step-up in basis to $1,000,000; 2) Gain: $1,000,000 (equal to debt balance of $2,000,000 minus $1,000,000 FMV); 3) Home equity deductions: $400,000 (accrued interest on $100,000 of the $400,000 mortgage); 4) Taxable Gain: $600,000; 5) Federal Tax: $90,000 (15% capital gains rate on Taxable Gain); and 6) Who pays tax: a) If borrower left a will, the Executor pays out of estate assets; b) If borrower bequeathed property to individual, the individual is liable and should consider disclaiming his interest; and c) If borrower died intestate, Administrator pays out of estate assets.

A less likely scenario is the surviving spouse moving out of the home (e.g., into a nursing home) as follows: First spouse dies after Jan. 1, 2011 and surviving spouse moves into nursing home or otherwise leaves home: 1) Basis in property stepped up partially to $550,000; 2) Gain on sale: $1,450,000 ($2,000,000 debt balance-$550,000); 3) Home equity deductions: $400,000; 4) Tax code section 121 Exclusion to surviving spouse: $500,000, if sale is in year of first spouse's death and joint return is filed; $250,000, if sale is in a year after year of first spouse's death or if joint return is not filed; 5) Taxable gain assuming sale more than a year after first spouse death: Taxable Gain: $1,450,000-$400,000-$250,000=$800,000; and 6) Federal Tax: $120,000 (15% capital gains rate on Taxable Gain).

As can be seen from this example, a reverse mortgage is hardly a "heads the borrower wins, tails the lender loses" proposition due to the debt forgiveness taxation upon sale of the home when the debt balance exceeds the home value.

The reverse mortgage industry is in a nascent state and is generally unsophisticated in tax matters. No loans have yet produced the above results due to how young the industry is. But given enough time, many existing loans will produce these adverse outcomes and borrowers will suffer financially. Lenders may also face legal and regulatory action by not disclosing these possible adverse outcomes to borrowers.

Another type of financial instrument has emerged in France called "viager" whereby a buyer can purchase the remainder interest of a homeowner. This provides the homeowner with liquidity linked to his home ownership and can achieve similar financial goals of a reverse mortgage. In the viager, the buyer of the remainder interest owns the home when the homeowner/seller dies.

However, there are many problems with the viager. First, should the homeowner/seller die shortly after completion of the viager sale, the buyer obtains a beneficial windfall. Such buyer benefit linked to the early death of the homeowner seems manifestly unfair. Further, it is not unlikely that courts and legislatures would act to regulate the viager in a manner similar to the "insurable interest" requirement for life insurance to prevent such perverse incentives.

Second, the viager is a one-off, inflexible instrument because it cannot be unwound. As such, it is particularly inappropriate for United States homeowners who have very high mobility, particularly homeowners in their 60's (approximately 8-10% per annum).

Third, the viager does not allow for flexible payments because it typically comprises an upfront component (the "bouquet") followed by lifetime annuity payments.

SUMMARY OF THE INVENTION

Ancient property law concepts divide a fee simple interest in real estate into a remainder interest and a life estate. The remainder interest can be sold separately from the life estate. The remainder interest is converted to fee simple upon the death of the life estate holder.

The present technology is directed toward a method and a system for providing a protected remainder interest financial instrument in which a seller sells a remainder interest in his or her illiquid asset to the buyer. The remainder interest is protected because it can provide a variety of financial options against the potentially harsh consequences of other financial instruments, such as the reverse mortgage or French viager (see above). Further, the protected remainder interest of at least one embodiment of the present technology permits medical underwriting and can include other basic parameters to better determine applicant life expectancy and permit more flexibility resulting an improved and more secure financial product.

The protected remainder interest can provide the benefits of a reverse mortgage (i.e., proceeds to purchase products and services) without duplicative reverse mortgage regulation of federal and state law. Further, unlike the reverse mortgage, the remainder interest has no debt balance and no non-recourse debt forgiveness taxation upon sale of the home.

In one aspect, the present technology is directed to a method for providing a protected remainder interest financial instrument, the method including the steps of submitting a seller to underwriting to accurately determine the seller's remaining life expectancy (less healthy seller's will sell their remainder interests for more) and purchasing the protected remainder interest of an illiquid asset from the seller leaving the seller with a life estate. The seller can be a homeowner or owner of other forms of real estate and the illiquid asset can be a home or other illiquid assets such as an apartment complex. The buyer can be a lender or an investor purchasing the protected remainder from the original lender.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION

The present disclosure overcomes many of the prior art problems associated with protected remainder interest financial instruments. The advantages, and other features of the systems and methods disclosed herein, will become more readily apparent to those having ordinary skill in the art from the following detailed description of certain preferred embodiments taken in conjunction with the drawings which set forth representative embodiments of the present invention. All relative descriptions herein such as left, right, up, and down are with reference to the Figures, and not meant in a limiting sense.

Figure 1:
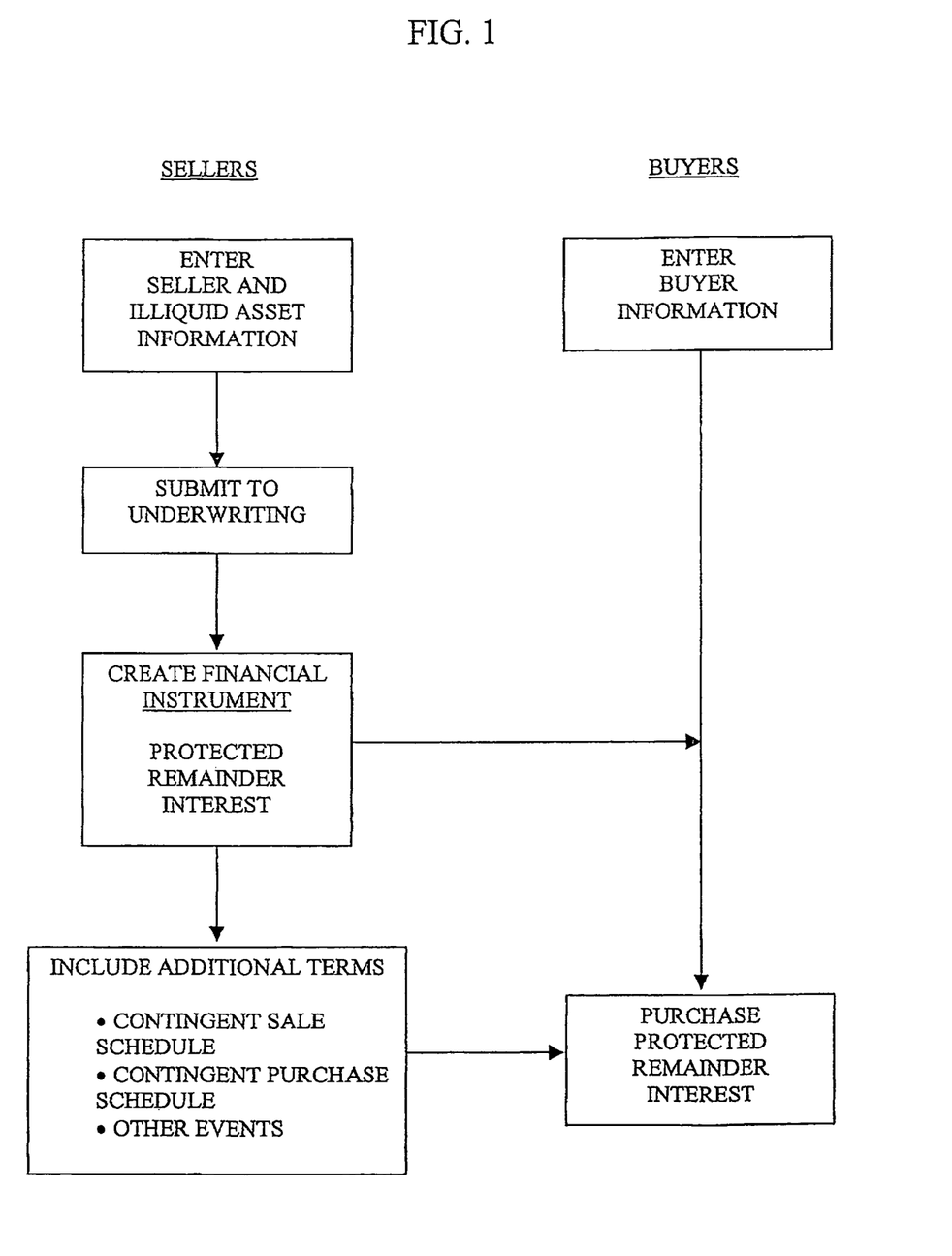
FIG. 1 is a flowchart illustrating an embodiment of a process for providing a protected remainder interest financial instrument in accordance with the subject technology.

FIG. 1 illustrates a method of present technology, including the steps of entering seller and asset information, submitting the information to underwriting, and creating a protected remainder interest financial instrument. In a further embodiment, method can further include entering information regarding a prospective buyer of the financial instrument. After creating the protected remainder interest financial instrument, the protected remainder interest is purchased by the buyer. In a further embodiment, the method can further include other steps for defining the protected remainder interest, including but not limited to providing a contingent sale schedule or a contingent purchase schedule, and other factors such as death of the seller, the seller moving out of the home, or the seller requiring long-term healthcare. The buyer can offer and purchase the protected remainder interest once these additional conditions are defined. Upon purchase of the protected remainder interest, the seller obtains a life estate in the asset, which is subject to any conditions, and upon death, the buyer obtains a fee simple. The buyer can sell the protected remainder interest to subsequent purchasers.

In a further embodiment, the method further includes the step of providing the seller the ability to sell the entire protected remainder interest currently or defer selling a portion of or all of the protected remainder interest at pre-specified terms provided by a buyer of the protected remainder interest.

In a further embodiment, the method further includes the step of providing the seller with a right for a number of years to repurchase protected remainder interest at pre-specified price from the buyer of the protected remainder interest under certain conditions (e.g., death, morbidity, or otherwise leaving a home).

In one embodiment of the present technology, the buyer provides a contingent sale schedule that lists the dates, amounts, and prices at which the seller can repurchase the remainder interest in the event the seller desires to move and sell the illiquid asset or the seller's estate desires to recapture illiquid asset equity by selling the illiquid asset. In a further embodiment, the illiquid asset is a home.

In one embodiment of the present technology, the buyer provides a contingent purchase schedule that provides the dates, amounts, and prices at which the buyer will purchase future sales of remainder interests should the seller not desire to sell his entire remainder interest at the creation of the financial instrument.

In one embodiment of the present technology, the contingent purchase and sale schedules can be based upon different events. For example, the protected remainder interest can provide for a contingent sale schedule in the event of death, a contingent sale schedule in the event of a seller move, and a contingent sale schedule in the event of a seller needing long term care. In the event the seller is still alive but moves and does not exercise his right to purchase to rejoin the remainder interest with his life estate, the buyer of the remainder interest needs to have a right to buy the seller's life estate so the buyer can rejoin the pieces. Otherwise, should the seller leave, no one can do anything with the house. Each side needs the right to purchase. The seller goes first. If the seller demurs, then the buyer has a right. Since the buyer is buying back the seller's life estate, the initial deal will specify all those prices by year.

In one embodiment of the present technology, the protected remainder interest can incorporate fixed prices or make reference to a future appraisal when providing the contingent sale schedule, the contingent purchase schedule, or both. In a further embodiment, the protected remainder interest can flexibly allocate varying and contingent amounts of home price risk between the remainder interest buyer and seller over time.

In one aspect, the present technology is directed to a method for providing a protected remainder interest financial instrument including the steps of collecting and displaying information related to a seller of an illiquid asset and, in response to a request to create the protected remainder interest, creating the protected remainder interest based on the information related to the seller and the illiquid asset. The method can include storing the information related to the protected remainder interest in a computer memory.

Figure 2:
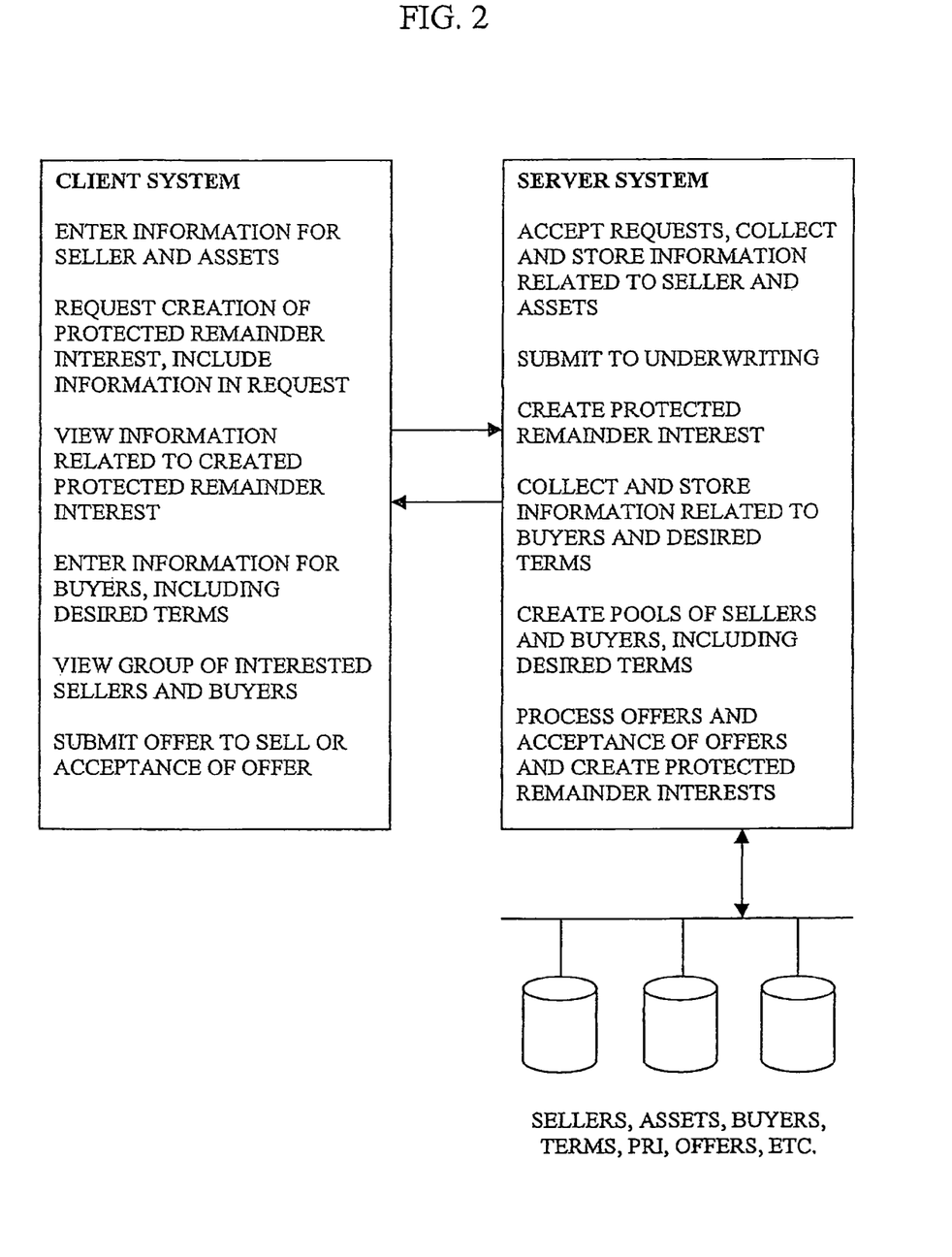
FIG. 2 is another flowchart illustrating an embodiment of a process for providing a protected remainder interest financial instrument in accordance with the subject technology.

FIG. 2 illustrates further embodiments of the present technology. On the left hand side of FIG. 2, a client system includes a display device for displaying information related to the protected remainder interest. The client system includes an input device for entering information related to a seller and an asset of the seller. The inputted information is displayed on the display device. The user of the system, for example, the seller or an agent of the seller, can initiate a request to a server system to create a protected remainder interest financial instrument. The request includes all the relevant information required to create the financial instrument. A buyer purchases the financial instrument, and the result of the transaction can be viewed on the client system display device.

The client system can include one or more software modules for integrating operations of the client components. For example, an input and request module can accept and display user input and initiate a request to the server system to create the financial instruments, the request including all the relevant information required to create the financial instrument. In a further embodiment, the client system can include a results module for displaying the results of the transaction, including accepting information from the server related to the created protected remainder interest, buyer information, and detailed information such as contingent purchase schedules and contingent sale schedules.

On the right hand side of FIG. 2, a server system accepts a request to create a protected remainder interest and collects and stores information regarding the seller and the asset. The server system submits the information to underwriting and creates the protected remainder interest financial instrument. A buyer purchases the financial instrument. The information related to the financial instrument and the transaction can be returned to the client system for display. In a further embodiment shown in FIG. 2, the server system can further store information related to buyers and the terms of the protected remainder interest. The terms include, but are not limited to, contingent sale schedules, contingent purchase schedules, and other events. The server system can store information related to sellers, assets, and buyers, offers to sell, acceptance of offers, and created protected remainder interest financial instruments. The server system can use the information to link sellers to buyers.

The server system can include software modules for integrating operations of the server components. For example, a request processing and protected remainder interest creation module for accepting requests to create a protected remainder interest financial instrument from the client system, and creating the financial instrument. The modules can further include modules for submitting the information to an underwriting system or process, which may include automated underwriting or manual underwriting. The modules can further include modules for accepting various parameters from the client system or from financial consultants including information related to contingent purchase schedules and contingent sale schedules. The modules can further include modules for packaging results and sending the information regarding the created protected remainder interest to the client system. Also, the modules can further include modules for tracking the financial instruments over time at regular intervals or in response to queries, and can provide updates on the status of the protected remainder interests, sellers, buyers, assets, and life estates. Further, the modules can further include modules for rejoining the protected remainder interest with the life estate.

In one aspect, the present technology is directed to a system configured to provide the methods described above. For example, the system can include a memory for storing software code, the software code for executing the steps of the methods of the embodiments described above. Furthermore, the system can be a web-based system comprising a client or server computer including software stored in memory for executing the steps of the method described above over a network.

In one aspect, the present technology is directed to a client system for sending a request to create a protected remainder interest financial instrument including a display device for displaying information related to a seller of a an illiquid asset and the illiquid asset, an input device for collecting the information and for issuing a request to a server system to create the protected remainder interest, the request including the information related to the seller of the illiquid asset, the illiquid asset, and other information required to create the financial instrument. The display device can include a computer monitor or similar device for displaying information. The input device can include a computer mouse or computer stylus. The user input can include clicking of a mouse button or pressing of a stylus to a screen. The request can be issued over a network coupling the client and server systems, including the Internet or an organization's intranet. In a further embodiment, the client system can collect information related to a buyer interested in purchasing a protected remainder interest and sending a request for a protected remainder to a server.

In a further embodiment, the client system can collect and send information related to sellers and illiquid assets of sellers, and buyers to a server system. The server can store and process buyer and seller information in order to facilitate matching buyers and seller based on preferred parameters. The server can further incorporate into the financial instrument contingent sale and purchase schedules and other events.

In one aspect, the present technology is directed to a server system for processing a request to create a protected remainder interest financial interest including server software stored in computer memory for receiving a request including information related to a seller and an illiquid asset of the seller and processing the information to create a protected remainder interest. The system can further include information related to a buyer desiring to purchase a protected remainder interest. The server system can include a memory for storing seller, asset, and buyer information. The information can be organized in a relational database or file system. The server system can link sellers to buyers to facilitate the creation and acceptance of the protected remainder interests.

In one aspect, the present technology is directed to a media device for storing software code for executing the steps of the methods of the embodiments described above. The software code can include one or more program modules for integrating operations of the components of the client system or the server system, as illustrated in FIG. 2 and as described above. Each set of modules could be shipped on separate media devices, or together on the same device. Each set of modules could further be designed to communicate and interact with each other.

In one aspect, the present technology is directed to a media device for storing information related to sellers, assets, buyers, and detailed protected remainder interest information. The information can be stored in a data file format. The information can be further be represented using a data structure or relational database format for supporting relationships between and amongst the data and for supporting information queries on the data.

The protected remainder interest has many advantages over similar financial interests including the reverse mortgage and the viager. Under the IRC, the remainder interest is a capital asset taxed only upon a subsequent sale by the purchaser of the remainder interest. Unlike reverse mortgage debt, the remainder interest is not taxed currently under the Original Issue Discount (OID) rules. Thus, the protected remainder interest is not subject to overly punitive, asymmetric, and inefficient taxation of the reverse mortgage. For example, the remainder interest can mitigate or eliminate the risk of taxes levied against loan debt forgiveness upon the termination of the reverse mortgage loan under conditions where the debt balance exceeds the home value.

Another advantage of the protected remainder interest over the reverse mortgage is that it can achieve the general results of a reverse mortgage transaction while allowing for the personal and medical underwriting of the customer to better determine his life expectancy. For example, consider a 70 year old male, single homeowner. The homeowner has a life expectancy (based upon the 2001 VBT Ultimate Table) of approximately 15 years. A 74 year old female has approximately the same life expectancy as a 70 year old male. Thus, a 70 year old male and a 74 year old female, based upon life expectancy alone, should each receive about the same amount of reverse mortgage proceeds (approximately 47.5% of home value at interest rates in force on Sep. 6, 2007). One of the problems with reverse mortgages is that the mortgage underwriter may not use the borrower's gender as a factor in determining life expectancy, which can affect the ultimate PLF. For example, an underwriter may use a FESA age in which a male aged 70 is considered to be FESA age 70. Because 70 year old females have a longer life expectancy than 70 year old males (about 3.2 years on the aforementioned mortality table), the practice of using FESA and assuming all borrowers are female provides males with much less proceeds than they could obtain if male life expectancy were recognized. In this example, a 70 year old male would receive only 42.5% of the home value in proceeds as this corresponds to what a female would be provided. But if gender were considered, the male borrower would receive 47.5% of the home value. The result can have significant economic consequences, e.g., $50,000 on a $1 million home.

The reason gender cannot be used in reverse mortgage lending is that it violates federal anti-discrimination laws governing credit transactions. However, these laws do not apply to the purchase of a remainder interest because it is not considered a credit transaction. Thus, a remainder interest purchaser can purchase a 70 year old male's remainder interest for a higher price than a 70 year old female's remainder interest since the former is economically more valuable and no laws prohibit the transaction. Furthermore, other sorts of information typically used by life insurance companies in determining life expectancy (e.g., medical status, smoking status, and so forth) can be considered in the remainder interest transaction, which cannot be used in the mortgage transaction.

Another advantage of the protected remainder interest is in its flexibility, which can offer more proceeds than a reverse mortgage or standard viager. In one aspect, the present technology is directed to a method and system for providing a protected remainder interest including the following steps: Step 1: Home Appraisal; Step 2: Borrower(s) underwriting to determine life expectancy, probability of mobility (moving in subsequent years), probability of morbidity (need to go into nursing home in subsequent years); Step 3: Responsive to the underwriting in step 2, determine an expected life of the remainder interest and corresponding life estate to be retained by the homeowner; Step 4: Provide homeowner with purchase price for remainder interest and a contingent offer schedule providing for dates and prices at which the homeowner's heirs or estate may repurchase the remainder interest in the event of death of the homeowner; a contingent offer schedule providing for dates and prices at which the homeowner may repurchase the remainder interest in the event the homeowner desires to move from the existing home; A contingent offer schedule providing for dates and prices at which the homeowner may repurchase the remainder interest in the event the homeowner requires assisted living care in the event the homeowner has difficulty performing some number of Activities of Daily Living (ADL); Step 5: Purchase the remainder interest from the homeowner and record the change in title; Step 6: Provide the homeowner with documentation of his retained life estate; Step 7: Survey the ongoing home by providing verification of payment of taxes, insurance, and performance of necessary maintenance; Step 8: Upon death of the homeowner, the purchaser receives the home in fee simple; and Step 9: Purchaser realization of economic value by sale or lease of home.

One example protected remainder interest transaction is as follows: 1) Value of home: $1,000,000; 2) Age and Sex: Single homeowner, male, aged 70; 3) Additional Health/Underwriting Information: Due to cardiovascular disease, rated age is 75; 4) Protected Remainder Interest Purchase Price: $532,000; 5) Home Price Appreciation (HPA) Assumption: 2%; 6) Premium for homeowner to Repurchase upon Death: $3,000; and 7) Premium for homeowner to Repurchase upon Move: $4,000.

In one embodiment of the present technology, the seller of the protected remainder interest has the right to repurchase ("Call") the remainder interest in future years for the following prices upon the death of the seller, as shown in Table 1.

TABLE 1

| Year | Call on Death |
|------|---------------|
| 1    | $611,800      |
| 2    | $703,570      |
| 3    | $809,106      |
| 4    | $906,198      |
| 5    | $1,014,942    |
| 6    | $1,136,735    |
| 7    | $1,239,041    |
| 8    | $1,350,555    |
| 9    | $1,472,105    |
| 10   | $1,604,594    |
| 11   | $1,749,008    |
| 12   | $1,906,418    |
| 13   | $2,020,803    |
| 14   | $2,142,052    |
| 15   | $2,270,575    |
| 16   | $2,406,809    |
| 17   | $2,551,218    |
| 18   | $2,704,291    |
| 19   | $2,866,548    |
| 20   | $3,038,541    |
| 21   | $3,220,854    |
| 22   | $3,414,105    |
| 23   | $3,618,951    |
| 24   | $3,836,088    |
| 25   | $4,066,254    |
| 26   | $4,310,229    |
| 27   | $4,568,843    |
| 28   | $4,842,973    |
| 29   | $5,133,551    |
| 30   | $5,441,565    |
| 31   | $5,768,058    |
| 32   | $6,114,142    |
| 33   | $6,480,990    |
| 34   | $6,869,850    |
| 35   | $7,282,041    |

The call schedule numbers in Table 1 are determined to provide a reasonable return on the protected remainder interest to the buyer should the seller repurchase the remainder interest in a given year. In addition, given the seller's age, gender, and health status, probabilities of death conditional upon survival to a given year are obtained from actuarial tables such as the 2001 Valuation Basic Table. These probabilities, known as "hazard rates" in the art, are then used to compute survivorship probabilities. In the first year, the survivorship probability is simply one minus the first year hazard rate. In the second year, the survivorship probability is the first year survivorship probability multiplied by the quantity of one minus the hazard rate for the second year. This process is repeated such that all of the survivorship probabilities are computed for each year.

From the hazard rates and the survivorship probabilities, the probability that the seller dies in a given year may also be computed. In the first year, this probability is simply equal to the hazard rate. The probability of death occurring in year 2 is the probability of surviving the first year multiplied by the hazard rate in year 2. Continuing in this fashion, all the probabilities of death in a given year may be computed. The expected cash-flow from repurchase in each year is then equal to the minimum of the home value in that year and the pre-specified repurchase price in that year as specified in Table 1, multiplied by the probability of death in that year. Using the expected cash-flows from death, the buyer can determine a reasonable expected return from purchasing the remainder interest subject to the right of the seller to repurchase at pre-specified prices as exemplified in Table 1. Presumably, the heirs of the seller of the protected remainder interest will only exercise this right if the home value at the point the right exists is greater than the repurchase price provided in the above example schedule.

In a preferred embodiment, the seller of the protected remainder interest may also have the right to repurchase the interest upon the event of the seller moving from the home. For example, should the seller move, the seller may have the right to repurchase the interest at the prices shown in Table 2.

TABLE 2

| Year | Call on Move |
|---|---|
| 1 | $611,800 |
| 2 | $703,570 |
| 3 | $809,106 |
| 4 | $930,471 |
| 5 | $1,070,042 |
| 6 | $1,230,548 |
| 7 | $1,415,131 |
| 8 | $1,627,400 |
| 9 | $1,871,510 |
| 10 | $2,039,946 |
| 11 | $2,223,541 |
| 12 | $2,423,660 |
| 13 | $2,569,080 |
| 14 | $2,723,224 |
| 15 | $2,886,618 |
| 16 | $3,059,815 |
| 17 | $3,243,404 |
| 18 | $3,438,008 |
| 19 | $3,644,288 |
| 20 | $3,862,946 |
| 21 | $4,094,723 |
| 22 | $4,340,406 |
| 23 | $4,600,830 |
| 24 | $4,876,880 |
| 25 | $5,169,493 |
| 26 | $5,479,662 |
| 27 | $5,808,442 |
| 28 | $6,156,949 |
| 29 | $6,526,366 |
| 30 | $6,917,948 |
| 31 | $7,333,024 |
| 32 | $7,773,006 |
| 33 | $8,239,386 |
| 34 | $8,733,749 |
| 35 | $9,257,774 |

The prices in Table 2 are calculated similarly to the prices in Table 1. Because the prices in Table 2 are to be paid upon seller mobility, hazard rates for mobility rather than mortality are used. These hazard rates may be obtained from US Census tables (such as S0701 Geographic Mobility by Selected Characteristics in the United States) or from home transaction data from such sources as the National Association of Realtors (NAR)

Mortality tables which are well known in the art, such as the 2001 VBT Ultimate Tobacco Distinct can be used to estimate the probability of death at each age. US Census data and home transaction data available from the National Association of Realtors (NAR) may be used to estimate the probability of a homeowner moving in a given year at a given age. For example, for the above seller whose age is equivalent to that of a 75 year old, Table 3 illustrates examples of estimated probabilities of mortality and moving each year following the sale of the protected remainder interest:

TABLE 3

| Year | Mortality | Mobility |
|---|---|---|
| 1 | 2.615% | 4.448% |
| 2 | 2.663% | 3.351% |
| 3 | 2.729% | 2.403% |
| 4 | 2.814% | 2.261% |
| 5 | 2.892% | 2.120% |
| 6 | 3.000% | 1.982% |
| 7 | 3.133% | 1.844% |
| 8 | 3.232% | 1.707% |
| 9 | 3.294% | 1.570% |
| 10 | 3.337% | 1.436% |
| 11 | 3.325% | 1.304% |
| 12 | 3.314% | 1.176% |
| 13 | 3.316% | 1.052% |
| 14 | 3.264% | 0.931% |
| 15 | 3.138% | 0.815% |
| 16 | 2.885% | 0.706% |
| 17 | 2.615% | 0.606% |
| 18 | 2.434% | 0.517% |
| 19 | 2.286% | 0.436% |
| 20 | 2.139% | 0.361% |
| 21 | 1.948% | 0.292% |
| 22 | 1.703% | 0.230% |
| 23 | 1.386% | 0.176% |
| 24 | 1.073% | 0.133% |
| 25 | 0.853% | 0.100% |
| 26 | 0.680% | 0.073% |
| 27 | 0.534% | 0.053% |
| 28 | 0.404% | 0.036% |
| 29 | 0.294% | 0.024% |
| 30 | 0.205% | 0.015% |
| 31 | 0.135% | 0.009% |
| 32 | 0.084% | 0.005% |
| 33 | 0.048% | 0.003% |
| 34 | 0.026% | 0.001% |
| 35 | 0.013% | 0.001% |

These probabilities of dying or moving in a given year are computed from mortality and mobility hazard rates, as noted above. These hazard rates are then transformed into survivorship probabilities. The probability of moving in a given year is the probability of in being the home and alive in the prior year multiplied by the hazard rate for mobility in that year. The probability of dying in the home in a given year is the probability of being alive and in the home in the prior year multiplied by the mortality hazard rate in that year.

Assuming, for example, the seller (one or more heirs of the seller) exercises his repurchase rights optimally in the event of death or in the event of moving, the expected cash flows to the purchaser of the protected remainder interest are as shown in Table 4.

TABLE 4

| |
|---|
| $(532,000) |
| $43,214 |
| $42,313 |
| $41,522 |
| $46,539 |
| $52,043 |
| $56,104 |
| $57,174 |
| $57,867 |
| $58,131 |

TABLE 4-continued $58,174
$57,551
$56,945
$56,506
$55,353
$53,206
$49,293
$45,107
$42,156
$39,654
$37,142
$33,941
$29,879
$24,629
$19,402
$15,626
$12,615
$10,005
$7,670
$5,656
$3,988
$2,665
$1,676
$986
$541
$275
$129
$55
$21
$7
$2
$1

The expected cash-flows in Table 4 are calculated as follows. In the event of a move, the expected cash-flow is the probability of a move in the given year from Table 3 multiplied by the minimum of either the price in Table 2 (right to repurchase upon move) or the then current home value. Similarly, the expected cash-flow in the event of death is the probability of a death in the given year from Table 3 multiplied by the minimum of either the price in Table 1 (right to repurchase upon death) or the then current home value. The total expected cash-flow in Table 4 in each year is the sum of these 2 values.

In addition to the ability to underwrite based upon gender and medical status, the protected remainder interests are more tax efficient, which can result in increased proceeds for the homeowner.

Two primary sources of inefficiency exist for the traditional reverse mortgage instrument. First, for the borrower, should the debt balance on the reverse mortgage exceed the home value when the loan is due (for example, because of the death of the last borrower or because the borrower moves out of the home the excess is considered income to the borrowers in the form of debt forgiveness under the Internal Revenue Code (IRC) and is therefore taxable. Under certain conditions, the borrowers may be able to shield some of this income with the special provisions related to shielding capital gains income on homes under the IRC, but these are limited to fixed amounts (currently $250,000 for an individual and $500,000 for a married couple). Second, for lenders and the investors to whom lenders and reverse mortgage originators sell loans, reverse mortgage loans that are not guaranteed by FHA present difficult tax challenges (i.e., the problems manifest for proprietary reverse mortgage loans or "jumbos"). For jumbo reverse mortgages, the nominal accrual rate is larger than the economic accrual due to a substantial portion of loans that will go into default. That is, the nominal accrual rate is set so that after taking into account loan losses, the accrual rate net of loan losses provides an acceptable expected return to the lender and loan investor.

This tax inefficiency arises from the difference between the nominal accrual rate and the economic accrual rate for an Original Issue Discount fixed income instrument such as a reverse mortgage. For a reverse mortgage, the lender or investor or other holder, must accrue the nominal loan rate even though (1) current income on the loans may not be paid; and (2) the nominal rate may never be paid. To illustrate these effects, consider the following example: 1) Value of home: $1,000,000; 2) Age of borrower: FESA age 70; 3) PLF: $426,500; 4) LIBOR: 5.50%; 5) Margin: 3.125%; and 6) Loan Rate: 8.625%.

Using the indicated and assumed pool factors which indicate what fraction of loans are outstanding at the end of any given year, Table 5 shows the pre-tax cash flows for this reverse mortgage:

TABLE 5

| End of year | Expected Cash Flows | Pool Factor |
| --- | --- | --- |
| 0 | $(426,500) | 0.9262 |
| 1 | $34,196 | 0.8592 |
| 2 | $33,712 | 0.7979 |
| 3 | $33,494 | 0.7415 |
| 4 | $33,515 | 0.6891 |
| 5 | $33,759 | 0.6408 |
| 6 | $33,880 | 0.5954 |
| 7 | $34,528 | 0.5526 |
| 8 | $35,373 | 0.5121 |
| 9 | $36,445 | 0.4734 |
| 10 | $37,685 | 0.4365 |
| 11 | $39,128 | 0.4007 |
| 12 | $41,230 | 0.3658 |
| 13 | $43,563 | 0.3322 |
| 14 | $39,960 | 0.2997 |
| 15 | $39,349 | 0.2681 |
| 16 | $39,008 | 0.2381 |
| 17 | $37,789 | 0.2092 |
| 18 | $37,250 | 0.1815 |
| 19 | $36,294 | 0.1554 |
| 20 | $34,917 | 0.1313 |
| 21 | $32,795 | 0.1102 |
| 22 | $29,421 | 0.0912 |
| 23 | $26,900 | 0.0741 |
| 24 | $24,800 | 0.0587 |
| 25 | $22,674 | 0.0459 |
| 26 | $19,277 | 0.0349 |
| 27 | $16,896 | 0.0258 |
| 28 | $14,320 | 0.0189 |
| 29 | $10,982 | 0.0136 |
| 30 | $8,615 | 0.0096 |
| 31 | $6,775 | 0.0065 |
| 32 | $5,255 | 0.0042 |
| 33 | $3,932 | 0.0026 |
| 34 | $2,822 | 0.0015 |
| 35 | $1,933 | 0.0008 |
| 36 | $1,253 | 0.0004 |
| 37 | $762 | 0.0002 |
| 38 | $433 | 0.0001 |
| 39 | $228 | 0.0000 |
| 40 | $112 | 0.0000 |
| 41 | $81 | 0.0000 |
| 42 | $— | 0.0000 |
| 43 | $— | 0.0000 |
| 44 | $— | 0.0000 |
| 45 | $— | 0.0000 |
| 46 | $— | 0.0000 |
| 47 | $— | 0.0000 |
| 48 | $— | 0.0000 |
| 49 | $— | 0.0000 |
| 50 | $— | 0.9262 |

The pool factor column in Table 5 is derived from the mortality and mobility hazard rates from, for example, the 2001 Valuation Basic Table (for mortality) and the US Census (for mobility). The pool factor is the proportion of original borrowers still alive and in their homes at the indicated year. In the first year, this is the product of the quantity one minus the respective hazard rates for mortality and mobility, i.e., the first year probability of surviving in one's home until the second year. The probability of surviving the second year in one's home (pool factor for year 2 in Table 5), is the pool factor for year 1, multiplied by the respective quantity of one minus the hazard rate for mortality and mobility, respectively. The remaining years are calculated similarly in an iterative fashion.

The expected cash flow column of Table 5 is calculated in two steps. First, the minimum of the debt balance and the home value is calculated in each year. In the first year, the number of loans paying due to death or mobility is one minus the pool factor in that year. The excepted cash-flow is this value multiplied by the minimum of the debt balance and the home value in that year (the debt balance in each year is calculated by compounding forward the initial loan proceeds by the loan rate; the home value in future years is calculated by compounding forward the initial home value by the HPA assumption). In the second year, the proportion of loans paying due to death or mobility is the pool factor in year 1 minus the pool factor in year 2. This quantity multiplied by the minimum of the debt balance and home value in year 2 is the expected cash-flow in year 2. The procedure is repeated iteratively for all years.

Referring now to Table 6, while the nominal yield or loan rate is 8.625%, the internal rate of return or economic yield of the above pre-tax cash flows is 6.96%. Assuming a tax-rate of 40% and applying the OID rules as described above, the after-tax cash flows are as shown in Table 6.

TABLE 6

| EOY | Pre Tax Expected Cash Flow | OID Taxable Income | Loan Losses | Taxable Income | Taxes | After Tax Cash Flow |
|---|---|---|---|---|---|---|
| 0 | $(426,500) | | | | | $(426,500) |
| 1 | $34,196.12 | $36,785.63 | $— | $36,785.63 | $14,714.25 | $19,481.87 |
| 2 | $33,712.18 | $37,008.97 | $— | $37,008.97 | $14,803.59 | $18,908.60 |
| 3 | $33,493.52 | $37,293.32 | $— | $37,293.32 | $14,917.33 | $18,576.19 |
| 4 | $33,514.61 | $37,621.05 | $— | $37,621.05 | $15,048.42 | $18,466.19 |
| 5 | $33,759.10 | $37,975.23 | $— | $37,975.23 | $15,190.09 | $18,569.00 |
| 6 | $33,879.72 | $38,338.87 | $— | $38,338.87 | $15,335.55 | $18,544.18 |
| 7 | $34,527.82 | $38,723.47 | $— | $38,723.47 | $15,489.39 | $19,038.43 |
| 8 | $35,373.01 | $39,085.35 | $— | $39,085.35 | $15,634.14 | $19,738.87 |
| 9 | $36,444.86 | $39,405.54 | $— | $39,405.54 | $15,762.22 | $20,682.64 |
| 10 | $37,684.75 | $39,660.90 | $— | $39,660.90 | $15,864.36 | $21,820.39 |
| 11 | $39,127.66 | $39,831.34 | $— | $39,831.34 | $15,932.54 | $23,195.12 |
| 12 | $41,229.68 | $39,892.03 | $— | $39,892.03 | $15,956.81 | $25,272.87 |
| 13 | $43,563.44 | $39,776.66 | $— | $39,776.66 | $15,910.66 | $27,652.77 |
| 14 | $39,959.60 | $39,450.05 | $1,300.03 | $38,150.02 | $15,260.01 | $24,699.59 |
| 15 | $39,349.44 | $38,911.03 | $4,203.09 | $34,707.93 | $13,883.17 | $25,466.26 |
| 16 | $39,008.41 | $38,133.60 | $7,252.45 | $30,881.15 | $12,352.46 | $26,655.95 |
| 17 | $37,789.27 | $37,058.79 | $10,209.28 | $26,849.51 | $10,739.80 | $27,049.47 |
| 18 | $37,249.72 | $35,753.09 | $13,405.38 | $22,347.71 | $8,939.09 | $28,310.63 |
| 19 | $36,293.73 | $34,110.82 | $16,528.92 | $17,581.90 | $7,032.76 | $29,260.97 |
| 20 | $34,916.74 | $32,149.11 | $19,454.51 | $12,694.59 | $5,077.84 | $29,838.91 |
| 21 | $32,794.69 | $29,897.83 | $21,825.68 | $8,072.14 | $3,228.86 | $29,565.83 |
| 22 | $29,421.22 | $27,451.23 | $22,975.60 | $4,475.62 | $1,790.25 | $27,630.97 |
| 23 | $26,900.48 | $25,017.72 | $24,312.89 | $704.83 | $281.93 | $26,618.55 |
| 24 | $24,799.96 | $22,500.54 | $25,660.01 | $(3,159.47) | $(1,263.79) | $26,063.75 |
| 25 | $22,674.01 | $19,851.38 | $26,620.44 | $(6,769.06) | $(2,707.62) | $25,381.64 |
| 26 | $19,276.94 | $17,094.62 | $25,493.26 | $(8,398.64) | $(3,359.46) | $22,636.40 |
| 27 | $16,896.05 | $14,522.86 | $25,015.25 | $(10,492.39) | $(4,196.96) | $21,093.01 |
| 28 | $14,319.80 | $11,998.69 | $23,611.47 | $(11,612.78) | $(4,645.11) | $18,964.91 |
| 29 | $10,982.02 | $9,624.77 | $20,076.58 | $(10,451.81) | $(4,180.72) | $15,162.75 |
| 30 | $8,615.12 | $7,670.86 | $17,394.26 | $(9,723.40) | $(3,889.36) | $12,504.49 |
| 31 | $6,775.27 | $6,006.60 | $15,056.99 | $(9,050.39) | $(3,620.16) | $10,395.43 |
| 32 | $5,254.56 | $4,576.71 | $12,815.12 | $(8,238.41) | $(3,295.37) | $8,549.93 |
| 33 | $3,931.57 | $3,362.58 | $10,495.04 | $(7,132.45) | $(2,852.98) | $6,784.55 |
| 34 | $2,822.28 | $2,370.63 | $8,226.88 | $(5,856.25) | $(2,342.50) | $5,164.78 |
| 35 | $1,932.57 | $1,595.06 | $6,138.77 | $(4,543.70) | $(1,817.48) | $3,750.05 |
| 36 | $1,253.18 | $1,017.96 | $4,329.67 | $(3,311.71) | $(1,324.68) | $2,577.86 |
| 37 | $762.11 | $612.23 | $2,859.07 | $(2,246.84) | $(898.73) | $1,660.84 |
| 38 | $432.90 | $345.41 | $1,760.76 | $(1,415.35) | $(566.14) | $999.04 |
| 39 | $228.36 | $181.85 | $1,005.62 | $(823.77) | $(329.51) | $557.87 |
| 40 | $111.60 | $88.91 | $531.43 | $(442.52) | $(177.01) | $288.61 |
| 41 | $80.65 | $40.05 | $414.81 | $(374.76) | $(149.90) | $230.55 |

In Table 6, the first column contains the expected cash-flows from Table 5. The second column computed each year's OID tax. The OID taxable income in year 1 is the loan rate multiplied by the initial loan proceeds. The OID taxable income in year 2 is the loan rate multiplied by the pool factor for year 1 multiplied by the initial loan proceeds. The OID taxable income for year 3 is the loan rate multiplied by the pool factor for year 2 multiplied by the initial loan proceeds. That is, the OID taxable income is the percentage of the loans outstanding as of the beginning of the year multiplied by the initial proceeds multiplied by the loan rate. The third column headed "Loan Losses" is the difference between the loan balance and the home value in that year. The amount by which the loan balance exceeds the then current home value is a "loan loss." In the fourth column headed Taxable Income is equal to OID Taxable Income less Loan Losses. Taxes are equal to the assumed ordinary tax rate of 40% multiplied by the given year's taxable income. The After Tax Cash Flow column is the Pre-tax Expected Cash-flow column minus Taxes. The internal rate of return (IRR) of the after-tax cash flows is 3.51% (internal rate of return is a standard calculation known in the art). Given the pre-tax IRR of 6.96%, the effective tax rate on the reverse mortgage is 49.63%. Thus, under the OID rules, which require accrual and payment of the nominal interest rate where the economic accrual rate is less, the effective tax rate is 9.63% higher than the actual tax rate. On a loan with an interest rate of 8.625%, the effective tax rate difference equates to over 83 basis points per annum in value. On a loan with a duration of approximately 10 years (not uncharacteristic of a reverse mortgage) the tax cost of the OID regimes entail over an eight point net present loss in tax efficiency. For an industry which aims to make one point of profit on proprietary loans and where a one point difference of proceeds for customers can determine product choice, an eight point loss due to the application of the OID rules to the current reverse mortgage loan structures is a substantial impediment to industry growth.

In contrast, the purchase of a protected remainder interest is a capital asset under the Internal Revenue Code. As such, the purchaser of the protected remainder interest is not subject to the OID rules and is not required to pay tax currently on the nominal loan rate accruing on the outstanding principal balance. Furthermore, the purchaser only pays tax when income is received which completely mitigates the problem of accruing at a nominal rate higher than the economic rate, i.e., the purchaser pays tax on actual income received. Additionally, this income is taxed at the capital gains rate. All of these considerations means the after tax rate on a protected remainder interest can be substantially larger than that of the reverse mortgage, as the following example illustrates (this is the same example as above for the reverse mortgage tax calculation):

| | |
|---|---|
| Value of home | $1,000,000 |
| Purchase | $426,500 |
| HPA | 2.0% |
| Return int IRR | 9.232% |
| at IRR | 8.222% |
| Age of borrower | 70 |
| Ordinary income tax rate | 40.0% |
| Capital gains | 15.0% |

The remainder interest has a higher pre-tax IRR than the reverse mortgage since it is not limited to a constant rate of return. This example illustrates, however, that the effective tax rate on a protected remainder interest is approximately 11% beginning from a pre-tax capital gains rate of 15%. Compared with current reverse mortgages, the effective tax rate can differ by 35% or more. In a preferred embodiment, protected remainder interests therefore earn a superior after tax return. The tax savings can be passed on to homeowner borrowers in the form of a greater conversion of home equity into cash proceeds.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for creating a protected remainder interest financial equity instrument on a computer, the method comprising the steps of:
submitting a seller to underwriting to electronically determine the seller's remaining life expectancy on the computer;
purchasing a protected remainder interest of an illiquid asset from the seller leaving the seller with a life estate; and
providing the seller the ability to defer selling at least a portion of the protected remainder interest at pre-specified terms electronically calculated on the computer and provided by a buyer of the protected remainder interest.

2. The method of claim 1 wherein the step of purchasing further comprises the step of:
providing the seller the ability to sell the entire protected remainder interest currently.

3. The method of claim 1 wherein the step of purchasing further comprises the step of:
providing the seller with a right for a number of years to repurchase the protected remainder interest at pre-specified price from the buyer of the protected remainder interest under certain conditions.

4. The method of claim 3 wherein the seller is an owner of the illiquid asset and the certain conditions include death of the owner.

5. The method of claim 3 wherein the seller is an owner of the illiquid asset and the illiquid asset is a home and the certain conditions include the owner moving from the home.

6. The method of claim 1 wherein the step of purchasing further comprises the step of:
a buyer of the protected remainder interest providing a contingent sale schedule that lists the dates, amounts, and prices at which the seller can repurchase the protected remainder interest in the event the seller desires to move and sell the illiquid asset or the seller's estate desires to recapture the illiquid asset equity by selling the illiquid asset.

7. The method of claim 1 wherein the step of purchasing further comprises the step of:
a buyer of the protected remainder interest providing a contingent purchase schedule that provides the dates, amounts, and prices at which the buyer will purchase future sales of portions of the protected remainder interest should the seller not desire to sell his entire remainder interest at the creation of the financial instrument.

8. The method of claim 1 wherein the step of purchasing further comprises the step of:
a buyer of the protected remainder interest providing a contingent sale schedule that lists the dates, amounts, and prices at which the seller can repurchase the protected remainder interest in the event of the seller's death or in the event the seller needs long term care.

9. The method of claim 1 wherein the step of purchasing further comprises the step of:
a buyer of the protected remainder interest providing a continent purchase schedule that provides the dates, amounts, and prices at which the buyer will purchase future sales of portions of the protected remainder interest in the event of the seller's death or in the event the seller needs long term care.

10. A system for providing a protected remainder interest equity financial instrument comprising a computer configured to:
- submit information related to a seller to an underwriting routine to accurately determine the seller's remaining life expectancy; and
- based on the seller's remaining life expectancy, purchase for a buyer a protected remainder interest of an illiquid asset from the seller leaving the seller with a life estate in the illiquid asset.

11. A computer readable medium whose contents cause a computer system to provide a protected remainder interest equity financial instrument, the computer system having a server program and a client program with functions for invocation by performing the steps of:
- a) submitting a seller to underwriting to accurately determine a remaining life expectancy of the seller;
- b) purchasing a protected remainder interest of an illiquid asset from the seller while creating a life estate for the seller in the illiquid asset; and
- c) using a contingent purchase schedule from a buyer of the protected remainder interest that provides a future date, amount, and price at which the buyer purchases at least a portion of the protected remainder interest.

\* \* \* \* \*